United States Patent [19]
Burns

[11] 3,766,605
[45] Oct. 23, 1973

[54] FISH SCALER
[76] Inventor: Lloyd G. Burns, 1461 Camille St., Shreveport, La.
[22] Filed: June 7, 1971
[21] Appl. No.: 150,415

[52] U.S. Cl. .................................... 17/64, 17/65
[51] Int. Cl. ........................................ A22c 25/02
[58] Field of Search ............................ 17/64, 65

[56] References Cited
UNITED STATES PATENTS
| | | | |
|---|---|---|---|
| 3,304,574 | 2/1967 | Ham et al. | 17/64 |
| 1,383,162 | 6/1921 | Sprague | 17/64 |
| 3,071,801 | 1/1963 | Scheiding | 17/65 |

FOREIGN PATENTS OR APPLICATIONS
| | | | |
|---|---|---|---|
| 303,155 | 3/1929 | Great Britain | 17/65 |

*Primary Examiner*—Lucie H. Laudenslager
*Attorney*—Richards, Harris and Hubbard

[57] ABSTRACT

A fish scaler comprises a mesh drum supported for rotation about a stationary tube. The drum is enclosed in a housing having a wide front opening and includes a door supported for pivotal movement outwardly through the front opening in the housing. Structure is provided for rotating the drum at low speed so that fish are carried upwardly and then slide and gently roll and tumble downwardly in the drum. Low pressure water is directed through the tube and is discharged into the drum to wash scales and other debris out of the drum.

1 Claim, 2 Drawing Figures

PATENTED OCT 23 1973　　　　　　　　　3,766,605

INVENTOR
LLOYD G. BURNS

Richards, Harris & Hubbard
ATTORNEYS

FISH SCALER

BACKGROUND AND SUMMARY OF THE INVENTION

This invention relates to a fish scaler, and more particularly to an improved fish scaler of the mesh drum variety.

It is well known that the scales of fish can be removed by placing the fish in a mesh drum, and then rotating the drum. For example, see U. S. Pat. No. 2,331,855, granted to Vucassovich on Oct. 12, 1943, and U.S. Pat. No. 3,304,574 granted to Ham et al. on Feb. 21, 1967. However, notwithstanding these and other attempts at providing a workable fish scaler, a number of problems have remained unsolved. For example, most of the prior art fish scalers have been operated at such a speed that the fish experience a harsh tumbling action within the mesh drum. This causes an undesirable pulping of the flesh of the fish. Also, many of the prior art fish scalers have required the use of a high pressure water spray. This is undesirable both because special pumps, etc. are required to provide the high pressure spray, and because the high pressure can force scales and other debris into cuts, etc., in the flesh of the fish.

The present invention comprises a novel fish scaler which overcomes the foregoing and other disadvantages that are characteristic of the prior art. In accordance with the preferred embodiment of the invention, a fish scaler comprises a fish receiving drum including a mesh cylinder and opposed ends, a tube extending through the drum and having discharge apertures formed in it, bearings which support the opposed ends of the drum on the tube, structure for rotating the drum relative to the tube, and structure for directing water through the tube and through the discharge apertures into the interior of the drum. The foregoing structure is preferably enclosed by a housing having a relatively wide front opening formed in it, and the mesh cylinder of the fish receiving drum is provided with a door mounted for pivotal movement outwardly through the front opening of the housing. The drum rotating apparatus is designed to rotate the drum at a slow speed so that fish in the drum are carried upwardly on the mesh cylinder and then slide and gently roll and tumble down the cylinder. The water directing apparatus is preferably operated at low pressure so that scales and other debris are washed out of the drum but are not forced into cuts, etc., in the flesh of the fish.

DESCRIPTION OF THE DRAWING

A more complete understanding of the invention may be had by referring to the following Detailed Description when taken in conjunction with the accompanying Drawing, wherein.

DETAILED DESCRIPTION

Figure 1:
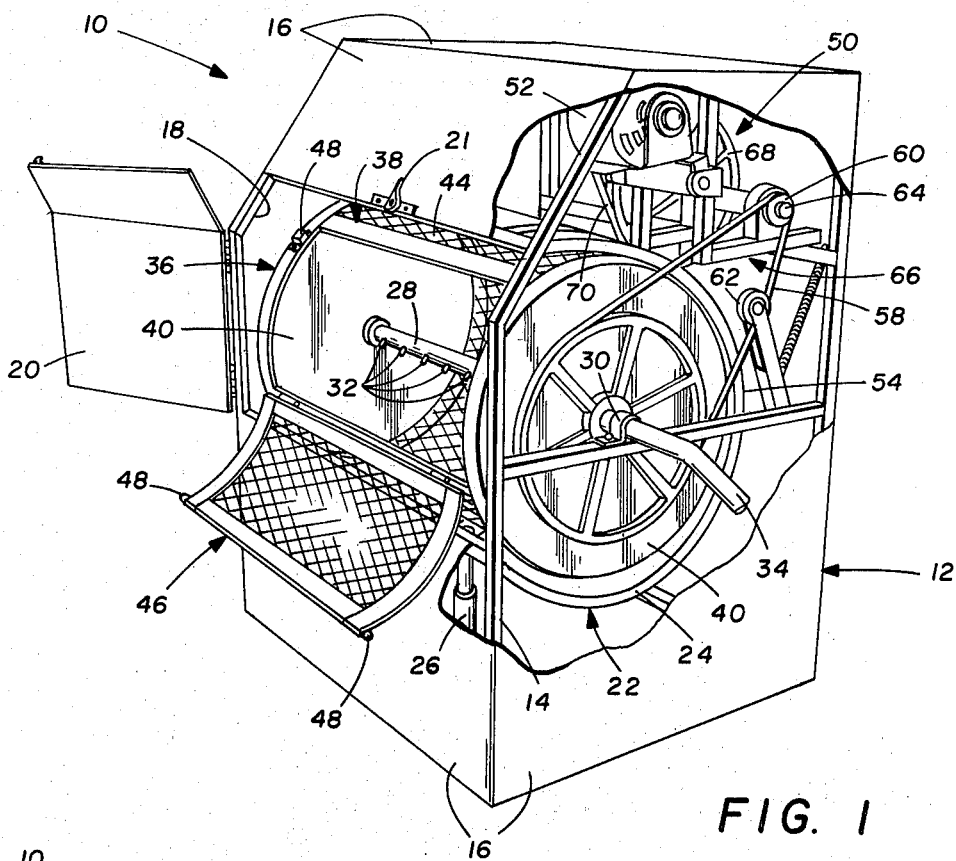
FIG. 1 is a perspective view of a fish scaler incorporating the invention in which certain parts have been broken away more clearly to illustrate certain features of the invention.

Referring now to the Drawing, there is shown a fish scaler 10 comprising the preferred embodiment of the invention. The fish scaler 10 includes a housing 12 which comprises a frame 14 and a plurality of panels 16 secured to the frame 14 to provide a substantially closed structure. A short, wide opening 18 extends across the width of the front of the housing 12. A pair of doors 20 are hingedly supported on the frame 14 for pivotal movement to close the opening 18. Conventional latching means 21 are provided for normally retaining the doors 20 in closed positions relative to the opening 18.

A splash guard 22 extends from the upper edge of the short wide front opening 18 through the interior of the housing 12 to the lower edge of the opening 18. As is most clearly shown in FIG. 2, the splash guard 22 is circular in configuration and is provided with inwardly turned end flanges 24 which may be augmented with end plates and/or baffles, if desired. A drain 26 extends downwardly from the bottom of the splash guard 22 and out of the housing 12.

As is best shown in FIG. 1, a hollow tube 28 is mounted within the splash guard 22 and extends parallel to the opening 18 formed in the housing 12. A pair of brackets 30 are utilized to retain the tube 28 on and to prevent rotation of the tube 28 relative to the frame 14. A plurality of discharge apertures extend through the tube 28 to a plurality of discharge nozzles 32 which are preferably directed angularly downwardly. In the use of the fish scaler 10, water is supplied to the hollow tube 28 through an inlet 34 at conventional municipal water supply pressure and is discharged from the nozzles 32 in form of a gentle spray.

A drum 36 is also positioned within the splash guard 22. The drum 36 comprises a mesh cylinder 38 and a pair of imperforate ends 40. The ends 40 of the drum 36 are supported on the hollow tube 28 by a pair of bearings 42, whereby the entire drum 36 is mounted for rotation relative to the hollow tube 28 and the housing 12.

The mesh cylinder 38 of the drum 36 comprises a main portion 44 that extends around the major portion of the periphery of the drum 36 and a door 46. The door 46 extends the entire width of the drum 36 and is supported for pivotal movement about an axis extending parallel to the axis of the hollow tube 28 outwardly through the front opening of the housing 12 to the position shown in FIG. 1. Conventional latch means 48 are provided for normally retaining the door 46 in a closed position relative to the remainder of the drum 36. Both the main portion 44 and the door 46 of the mesh cylinder 38 are preferably formed from expanded metal, or the like.

The fish scaler 10 further includes a drive mechanism 50 for rotating the drum 36 relative to the hollow tube 28. The drive mechanism 50 comprises an electric motor 52 and a speed reducer mechanism 54 whereby the drum is rotated at a very low speed, i.e., about 27 revolutions per minute. The speed reducer mechanism 54 comprises a large diameter pulley 56 which is secured to the drum 36 and which is driven by a belt 58. The belt 58 extends around a small diameter pulley 60 and an idler pulley 62 that is spring loaded to maintain tension in the belt 58.

Figure 2:
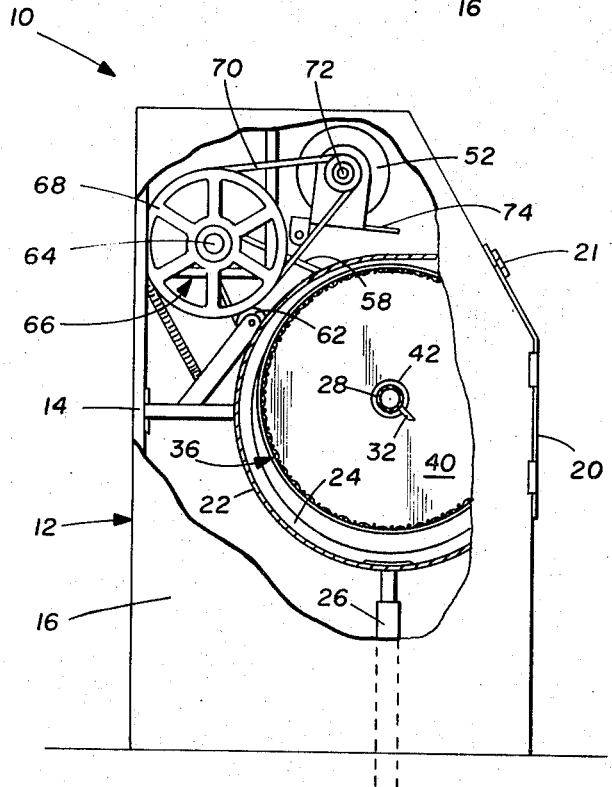
FIG. 2 is an end view of the fish scaler shown in FIG. 1.

The small diameter pulley 60 is supported on a jack shaft 64 which is rotatably supported on a subframe 66. The jack shaft 64 connects the pulley to a large diameter pulley 68 which is driven by a belt 70. As is best shown in FIG. 2, the belt 70 extends around a small diameter pulley 72 which is driven by the motor 52. The motor 52 is supported on a bracket 74 which is pivotally supported on the subframe 66 to maintain tension in the belt 70. Those skilled in the art will realize that the speed reducer mechanism 54 may incorporate plural belt drives, if desired.

OPERATION

The fish scaler 10 is utilized by opening the doors 20 of the housing 12 and opening the door 46 of the drum 36. Then, fish are inserted into the interior of the drum 36. This is facilitated by the size and configuration of the opening 18 in the housing 12 and by the size of the door 46 in the drum 36, whereby fish can be poured into the drum directly from a container without touching the fish and with no danger of soiling clothing, etc.

When the drum 36 has been loaded with fish, the door 46 and the doors 20 are returned to their normal, closed positions. Then, water at conventional municipal pressure is admitted to the tube 28 through the inlet 34 and flows from the tube through the nozzles 32 in the form of a gentle spray. At the same time, the drive mechanism 50 is actuated to rotate the drum 36 within the housing 12. The speed of rotation of the drum 36 is preferably such that fish in the drum first ride up on and then slide and gently roll and tumble downwardly along the mesh cylinder 38 of the drum. For example, it has been found that if a drum having a diameter of approximately 20 inches is rotated at a speed of approximately 27 RPM, fish will not tumble harshly in the cylinder as is characteristic of prior art fish scalers, but instead will ride upwardly on the drum and then either slide downwardly on the cylinder of the drum or gently roll and tumble downwardly in the drum.

As the fish in the drum 36 slide down the mesh cylinder 38, the scales of the fish are removed. The scales and other debris are immediately washed out of the drum 36 and into the splash guard 22, and out of the splash guard 22 and into the drain 26 by the water spraying from the nozzles 32. The period of operation of the fish scaler 10 is dependent upon the nature of the particular fish that are loaded into the drum 36. For example, fish having relatively soft scales such as white perch can be rotated for as little as 8 minutes, whereas fish having relatively tough scales such as blue gills must be rotated for as long as 12 minutes. After the fish scaler 10 has been operated long enough to remove all of the scales from the fish in the drum 36, the flow of water through the hollow tube 28 and the operation of the drive mechanism 50 are discontinued. Then, the doors 46 and 20 are opened and the fish are removed from the drum 36.

One advantage in the use of the present invention over prior art fish scalers is that due to the slow speed of rotation of the drum 36, the flesh of the fish in the drum does not become pulped, even through the fish scaler is operated longer than necessary to remove the scales of the fish. Another advantage comprises the use of low pressure water and a gentle spray to remove debris from the drum. This prevents any possibility of forcing scales and other debris into cuts, etc., in the flesh of the fish. Still another advantage in the use of the present invention comprises the size of the front opening 18 in the housing and the door 46 in the drum 36 and the orientation of the drum 36 relative to the opening 18, whereby fish may be easily and quickly placed in and removed from the drum.

It will be understood that the design of the fish scaler 10 illustrated in the Drawing can be varied in accordance with particular circumstances. For example, the electric motor can be replaced by an internal combustion engine to permit usage of the fish scaler in remote locations. Similarly, the belt and pulley speed reducer mechanism illustrated in the Drawing may be replaced by other conventional speed reducers, if desired. Finally, the fish scaler 10 may be equipped with coin operated timing circuitry or other timing control means. Those skilled in the art will immediately envision further modifications which can be incorporated in the basic fish scaler, if desired.

From the foregoing, it will be understood that the present invention comprises a fish scaler which is comprised of a small number of readily available parts and is therefore both easily and economically manufactured and readily serviced in the field. Fish scalers incorporating the invention require only conventional electric power and water supplies, and are therefore readily adapted for use in almost any location. Finally, fish scalers incorporating the invention are characterized by slowly rotating drums and gentle water sprays, and therefore do not tend to pulp the flesh of fish or to force scales and other debris into cuts, etc., in the flesh of the fish.

Although the preferred embodiment of the invention has been illustrated in the accompanying Drawing and described in the foregoing specification, it will be understood that the invention is not limited to the embodiment disclosed, but is capable of rearrangement, modification, and substitution of parts and elements without departing from the spirit of the invention.

What is claimed is:
1. A fish scaler comprising:
   a substantially closed cabinet including a cabinet door in the front thereof supported for pivotal movement to provide an opening extending across the width of the cabinet,
   a generally cylindrical splash-guard mounted within the cabinet and extending from the top of said opening to the bottom of said opening,
   a fish receiving drum rotatably mounted about its axis in the splash-guard and including opposed ends and a mesh cylinder extending between the ends, said mesh cylinder having surfaces for removing fish scales and including openings through which said fish scales may pass into said splash-guard,
   a drum door formed in said mesh cylinder and being substantially equal in width to said mesh cylinder, means supporting said drum door on said fish receiving drum for pivotal movement about an axis extending parallel to the axis of rotation of said cylinder outwardly through the opening in said cabinet, latch means being provided for normally retaining said door in a closed position,
   a tube extending coaxially through said fish receiving drum and a plurality of discharge apertures each extending between the interior of said tube and the interior of said fish receiving drum,
   bearing means for rotatably supporting both ends of said fish receiving drum on said tube,
   an electric motor mounted within said cabinet,
   speed reducer means forming a drive connection between the output of said electrical motor and the fish receiving drum in order to rotate said fish receiving drum, said drum being rotated at a speed such that fish are carried upwardly by said mesh cylinder and then slide and gently roll downwardly in said cylinder to thereby remove said fish scales without pulping fish, means for discharging water through said discharge apertures in said tube into said fish receiving drum during rotation thereof to thereby wash said fish scales from said drum without forcing said fish scales and other debris into the flesh of the fish, and a drain formed in the bottom portion of said splashguard in order to drain water and fish scales therethrough.

* * * * *